(12) United States Patent
Shaw

(10) Patent No.: US 9,608,875 B2
(45) Date of Patent: Mar. 28, 2017

(54) INDIVIDUALLY UNIQUE KEY PERFORMANCE INDICATOR MANAGEMENT

(71) Applicant: AT&T Intellectual Property I, LP, Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 54 days.

(21) Appl. No.: 14/081,435

(22) Filed: Nov. 15, 2013

(65) Prior Publication Data

US 2015/0138988 A1    May 21, 2015

(51) Int. Cl.
*G01R 31/08* (2006.01)
*H04J 1/16* (2006.01)
*H04L 12/24* (2006.01)
*H04L 12/26* (2006.01)

(52) U.S. Cl.
CPC ...... *H04L 41/5025* (2013.01); *H04L 41/5009* (2013.01); *H04L 43/16* (2013.01)

(58) Field of Classification Search
CPC ............................. H04W 24/00; H04W 92/02
See application file for complete search history.

(56) References Cited

U.S. PATENT DOCUMENTS

| | | | |
|---|---|---|---|
| 5,896,561 A * | 4/1999 | Schrader et al. | 455/67.11 |
| 6,717,915 B1 | 4/2004 | Liao et al. | |
| 7,929,457 B2 | 4/2011 | Healy et al. | |
| 7,941,136 B2 | 5/2011 | Reed et al. | |
| 8,010,100 B2 | 8/2011 | Kushwaha et al. | |
| 8,135,395 B2 | 3/2012 | Cassett et al. | |
| 8,385,240 B2 | 2/2013 | Krishnaswamy | |
| 8,401,517 B1 | 3/2013 | Levine et al. | |
| 8,422,441 B2 | 4/2013 | Dan | |
| 8,438,378 B2 | 5/2013 | Lazar | |
| 8,503,300 B2 | 8/2013 | Patel et al. | |
| 8,504,082 B2 | 8/2013 | Tayloe et al. | |
| 8,565,757 B1 | 10/2013 | Tran et al. | |
| 8,649,270 B2 * | 2/2014 | Fidler | H04L 41/0681 370/241 |
| 8,824,315 B2 * | 9/2014 | Kokkinen et al. | 370/252 |
| 2003/0096606 A1 | 5/2003 | Inman et al. | |
| 2007/0066298 A1 | 3/2007 | Hurst | |
| 2008/0212487 A1 | 9/2008 | Silvestri et al. | |
| 2009/0227251 A1 | 9/2009 | Lei et al. | |
| 2010/0123575 A1 | 5/2010 | Mittal et al. | |
| 2010/0190481 A1 | 7/2010 | Nath et al. | |
| 2010/0255826 A1 * | 10/2010 | Brewer et al. | 455/414.1 |
| 2011/0044291 A1 | 2/2011 | Omar | |

(Continued)

FOREIGN PATENT DOCUMENTS

| | | | | |
|---|---|---|---|---|
| CN | WO 2012045241 A1 * | 4/2012 | | H04W 24/08 |
| WO | WO 2013016244 A1 * | 1/2013 | | |

*Primary Examiner* — Maharishi Khirodhar
(74) *Attorney, Agent, or Firm* — Baker & Hostetler LLP

(57) ABSTRACT

Individually unique key performance indicator management may be utilized to enhance performance in a network. A warning alarm threshold for a key performance indicator associated with a mobile device may be determined. And upon receiving an alert message indicating that the warning alarm threshold has been exceeded, a network device may be modified.

15 Claims, 10 Drawing Sheets

(56) References Cited

U.S. PATENT DOCUMENTS

| | | | |
|---|---|---|---|
| 2011/0158090 A1* | 6/2011 | Riley | H04L 12/14 370/230 |
| 2011/0208984 A1 | 8/2011 | Naware et al. | |
| 2012/0036498 A1 | 2/2012 | Akirekadu et al. | |
| 2012/0127961 A1* | 5/2012 | Kawamura et al. | 370/335 |
| 2013/0117842 A1* | 5/2013 | Kakadia et al. | 726/22 |
| 2013/0231947 A1 | 9/2013 | Shusterman | |
| 2013/0304905 A1* | 11/2013 | Appachiappan | H04L 41/5032 709/224 |
| 2013/0308514 A1* | 11/2013 | Yokoyama | H04W 52/0241 370/311 |
| 2014/0101297 A1* | 4/2014 | Neisinger | H04L 65/4084 709/223 |
| 2014/0213256 A1* | 7/2014 | Meylan et al. | 455/436 |

* cited by examiner

INDIVIDUALLY UNIQUE KEY PERFORMANCE INDICATOR MANAGEMENT

TECHNICAL FIELD

The technical field generally relates to wireless communications and more specifically performance indicators.

BACKGROUND

Key performance indicators (KPIs) may provide network operators with parameters concerning the effectiveness of network services that are provided to end users. KPIs may reflect the measurement of various parameters associated with, for example, network accessibility, call retainability, device mobility, and network capacity. Although KPIs may be used to help manage backbone network capacity users continue to look for a better experience with their use of phones, tablets, laptops, and other devices on telecom networks.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

In an embodiment, a method may include determining a warning alarm threshold for a key performance indicator associated with a mobile device, receiving an alert message based on reaching the warning alarm threshold, and modifying a network device based on the alert message.

In an embodiment, a device may include a processor coupled with a memory. The memory may have executable instructions stored thereon that when executed by the processor cause the processor to effectuate operations including receiving an alert message based on reaching a warning alarm threshold for a key performance indicator associated with a mobile device and providing instructions to modify a network device based on the alert message.

In an embodiment, a system may include a mobile device and a home subscriber server. The home subscriber server may have a processor coupled with a memory. The memory may have executable instructions stored thereon that when executed by the processor cause the processor to effectuate operations including storing a key performance indicator of the mobile device, receiving an alert message based on reaching a warning alarm threshold for the key performance indicator associated with the mobile device, and providing instructions to modify a network device based on the alert message.

BRIEF DESCRIPTION OF THE DRAWINGS

The following detailed description is better understood when read in conjunction with the appended drawings. For the purposes of illustration, exemplary embodiments are shown in the drawings; however, the subject matter is not limited to the specific elements and instrumentalities disclosed. In the drawings.

DETAILED DESCRIPTION OF ILLUSTRATIVE EMBODIMENTS

A key performance indicator (KPI) may be used with a user profile to manage performance for a wireless transmit/receive unity (e.g., mobile device). The device may have a key performance indicator (KPI) associated with a device identification or a subscriber identification of the mobile device. Threshold values associated with a device may trigger modification (e.g., re-provisioning) of resources to meet KPI requirements for an individual WTRU.

Figure 1:
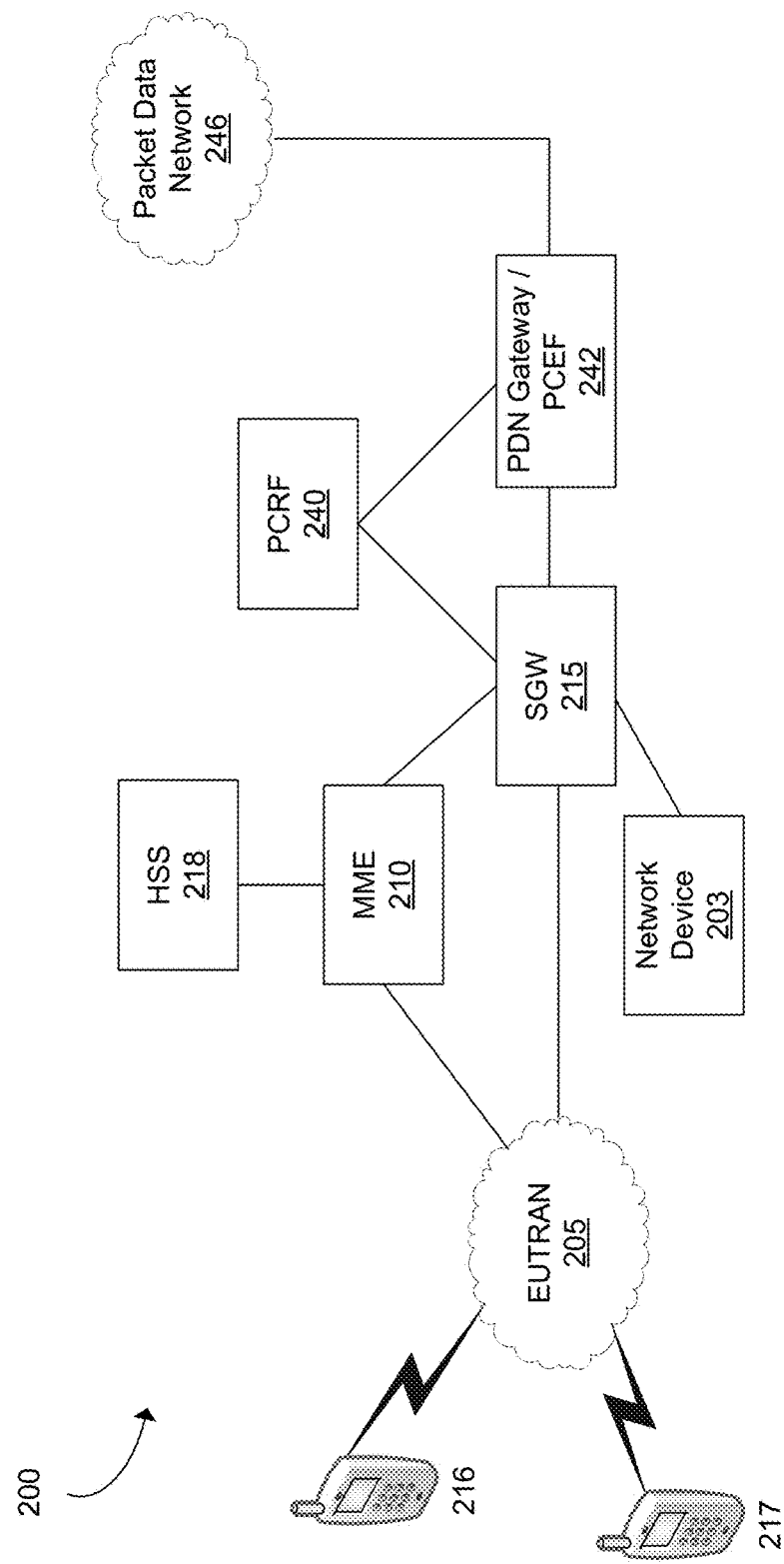
FIG. 1 illustrates a system diagram of an example communications system in which one or more disclosed embodiments of individually unique key performance indicator management may be implemented.

FIG. 1 illustrates a non-limiting exemplary architecture of a long term evolution (LTE) network, in which one or more disclosed embodiments of individually unique key performance indicator management may be implemented. As illustrated, network architecture 200 of FIG. 1 includes a wireless transmit/receive unit (WTRU) 216, a WTRU 217, an Evolved Universal Terrestrial Radio Access Network (EUTRAN) 205, a mobility management entity (MME) 210, a signaling gateway (SGW) 215, a home subscriber server (HSS) 218, a policy and charging rules function (PCRF) 240, and a packet data network gateway (PDN) or Policy and Charging Enforcement Function (PCEF) 242. The devices in FIG. 1 may be communicatively connected with each other. The PDN gateway 242 may provide a gateway between the LTE network and a public packet data network 246 which may comprise IP networks that connect to data services. HSS 218 may perform functions customary to an HSS such as AAA functions and subscriber location functions, but the HSS may also have additional functions dealing with KPIs for particular devices such as WTRU 216 or WTRU 217.

Figure 2:
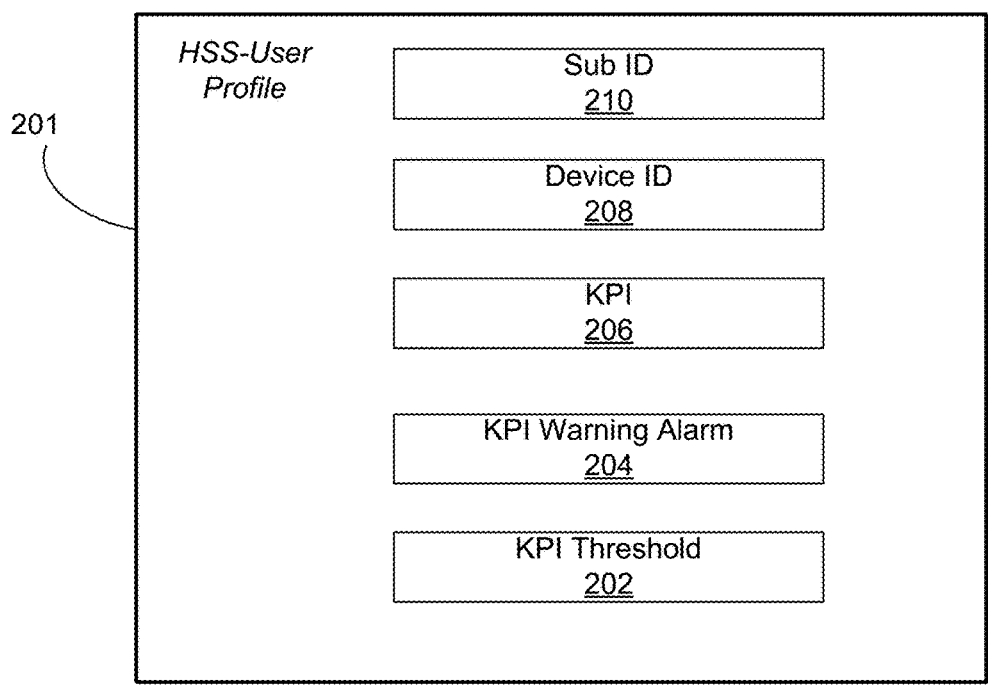
FIG. 2 illustrates a non-limiting exemplary block diagram of a user profile a home subscriber server.

FIG. 2 illustrates an exemplary block diagram 201 of a user profile with KPI data. The user profile may be located on an HSS. User profile 201 may have user profile data that includes subscriber identification (Sub ID) 210, device ID 208, a key performance indicator (KPI) 206, KPI warning alarm 204, and KPI threshold 202. KPI 206 may be associated with Sub ID 210, device ID 208, or both. User profile 201 may also data that includes a phone model for a WTRU, wireless technology format capability (e.g., GPRS, LTE, WiFi, CDMA, etc.) for a WTRU, and common demographics of a user of the WTRU. The demographics may include user age, home ownership, employment status, physical state (e.g., disabled or pregnant—may receive resource priority), birthday, education status, income, and the like.

As discussed herein, KPI 206 may be part of user profile 201 and associated with a single WTRU not just a network element (e.g., an MME or SGW). KPI 206 may be assigned to an individual WTRU based on a user preference as it relates to individual KPIs or different KPI service levels, among other things. KPI service levels as discussed herein may be considered the grouping of multiple KPIs for a service such as, high definition audio (HD audio), HD video, or voice to text, or the like. For example, HD audio may have 10 KPIs, HD video may have 20 KPIs, and voice to text may only have 5 KPIs. KPI 206 may be associated with a business entity or other group which may have multiple WTRUs.

User profile 201 may also include a KPI warning alarm 204. KPI warning alarm 204 may be an alert that is triggered based on meeting a threshold level for a fault that is related to KPI 206. KPI warning alarm 204 may be used by the network provider to trigger modifications in network resources that may include routers and WTRUs. An HSS or another device may send warning alarm 204 as a proactive update to a user of the WTRU. KPI warning alarm 204 may include faults such as a call drop, a call interruption, data packet loss, video pixelation, or the like. User profile 201 includes a KPI threshold 202. KPI threshold 202 is a threshold in which a KPI has failed to be met for a predetermined time period.

Figure 3:
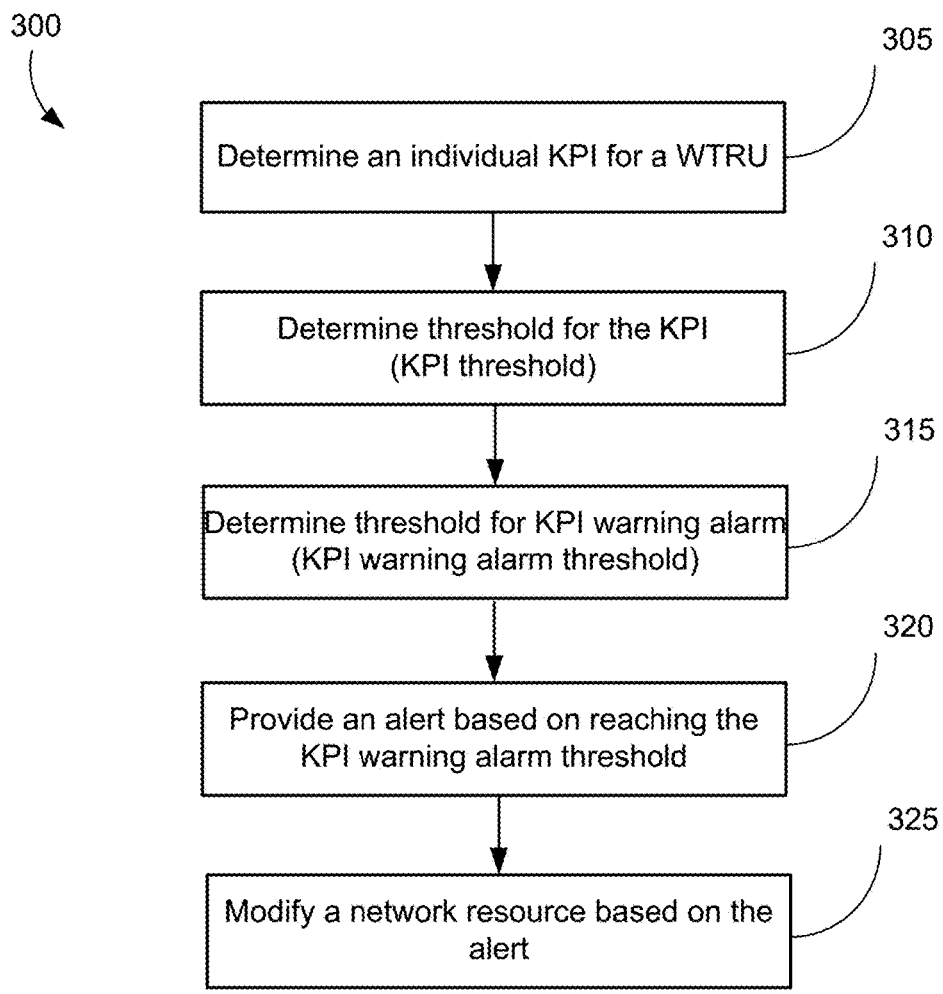
FIG. 3 illustrates a block diagram of a non-limiting exemplary method for implementing one or more disclosed embodiments of individually unique key performance indicator management.

FIG. 3 illustrates a non-limiting exemplary method 300 for implementing individual KPI management. In an exemplary embodiment at block 305, a KPI may be determined for a WTRU (e.g., mobile phone). A KPI may be chosen by a user, a network provider, an administrator of a user profile, or another entity. In an embodiment, the network provider may determine a subscriber's KPIs based on a voice usage level, a data usage level, a number of referrals of others to the service of the network provider, or demographics, among other things that may indicate the importance of the subscriber.

The KPI associated with a WTRU may include the number of dropped calls, packet loss, network availability for voice or data services, data speeds, call interruptions, or the like. The KPI also may be based on a date or time (e.g., nights or weekends), a location of the WTRU, or a source of a connection with the WTRU, among other things. KPI may be a metric over any predetermined period of time (e.g., second, hour, day, or month) and may be any statistical measurement (e.g., a measure of central tendency—average, median, or mode). For example, a KPI may involve data throughput (e.g., megabits/second) during a period of time (e.g., a weekend) at a certain location (e.g., a 5 mile radius of an address) when connected to a particular source.

At block 310, a threshold for the KPI (KPI threshold) may be determined. The KPI threshold may be considered the threshold in which a network provider has broken a service level agreement over a time period, which may have been self-imposed by the network provider (e.g., self-imposed to be competitive or for other business reasons) or formally agreed to with a customer. At block 315, a threshold for a KPI warning alarm (KPI warning alarm threshold) may be determined. The KPI warning alarm threshold is usually less than the KPI threshold. At block 320, an alert may be provided based on reaching the KPI warning alarm threshold. The KPI warning alarm threshold may be considered the threshold in which a network provider uses to alert of a fault in performance of a network. For example, a KPI warning alarm threshold may be set for any packet loss or packet loss that occurs for several minutes. At block 325, a network resource may automatically be modified based on the alert. In an embodiment, the network resource may not be modified if there is an emergency situation, such a natural or manmade disaster, a significant network outage, or the like.

With reference to FIG. 1, for illustrative purposes, WTRU 216 may have a user profile (e.g., user profile 201) and the KPI warning alarm may trigger a modification of a network resource. WTRU 217 may have another user profile and may or may not have an active KPI warning alarm. In an embodiment, a network resource modification may include the modification of WTRU 216. Based on the alert provided, the power output of WTRU 216 may be changed, the number or type of wireless antennas used by WTRU 216 may be changed (e.g., increasing the number for more bandwidth or decreasing the number for less processor load), or the applications on WTRU 216 that interfere with performance may be shutdown, among other things. The instructions for modifications of the WTRU 216 may come from a device on the backbone network of the network service provider.

In an embodiment of individually unique key performance indicator management, a network resource modification may include changing the base stations used (e.g., LTE or WiFi) by WTRU 216, changing the routed path of data or voice of WTRU 216, dropping the calls of WTRU 217 (i.e., any other WTRU), reducing the data rate of WTRU 217, activating base stations or other network resources that may have been dormant (e.g., powered off or in a sleep-like mode), changing the quality of service of packets traveling through the network from or to WTRU 216, allocating wireless or wireline channels for voice or data for WTRU 216, or redirecting WTRU 217 to Wi-Fi or other base stations to accommodate WTRU 216. The manipulation of other WTRUs (e.g., WTRU 217) may be done in a round robin or like fashion in order to not excessively disturb the connection of any particular WTRU. For example, WTRU 217 may only have its connection purposely disturbed (e.g., disconnected) once every week.

Figure 4:
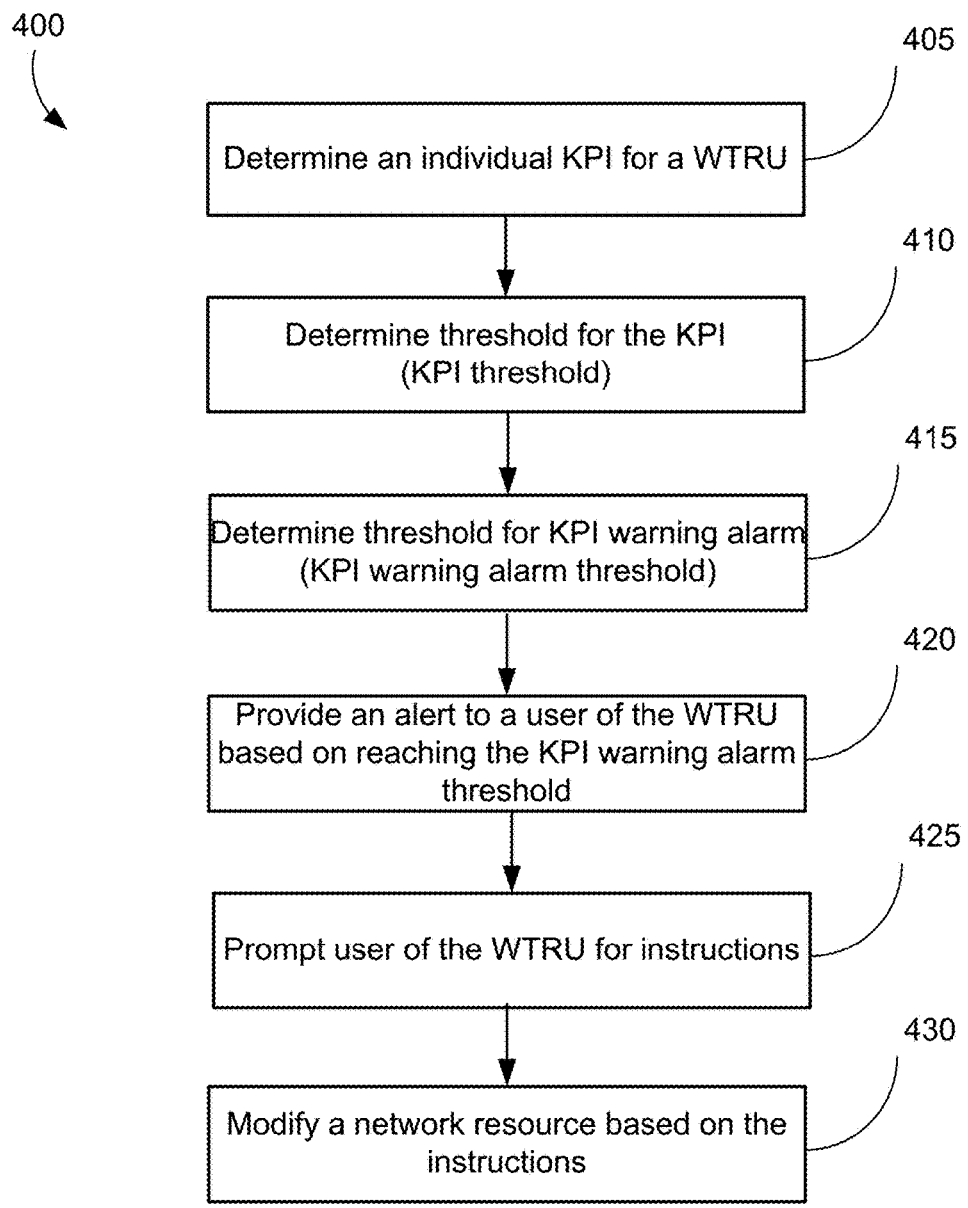
FIG. 4 illustrates a block diagram of a non-limiting exemplary method for implementing one or more disclosed embodiments of individually unique key performance indicator management.

FIG. 4 illustrates a non-limiting exemplary method 400 for implementing individual KPIs. In an exemplary embodiment at block 405, a KPI may be determined for a WTRU. At block 410, a threshold for the KPI threshold may be determined. At block 415, a threshold for a KPI warning alarm threshold may be determined There may be multiple KPI warning alarm thresholds. The extent of the modifications to network resources may be based on which of the multiple KPI warning alarm thresholds is reached. At block 420, an alert may be provided to a user of the WTRU based on reaching the KPI warning alarm threshold. The alert may be sent via text message, e-mail, or an interactive voice prompt, among other ways.

At block 425, the user of the WTRU (or the owner of the user profile) may be prompted for instructions. The prompt may include a list of choices. The list of choices may be a listing of KPI threshold preferences for a user to choose and corresponding costs for the KPI threshold preferences. In this case, the network provider may automatically determine what network resources to change in order to meet the KPI threshold preferences. In an embodiment, the list of choices may be relatively more complex and include cost for manipulation of resources and resources to manipulate, such as base stations, routers, power output levels of network resources, and the like. At block 430, the network resource may be modified based on the instructions from the WTRU as chosen by the user.

Figure 5:
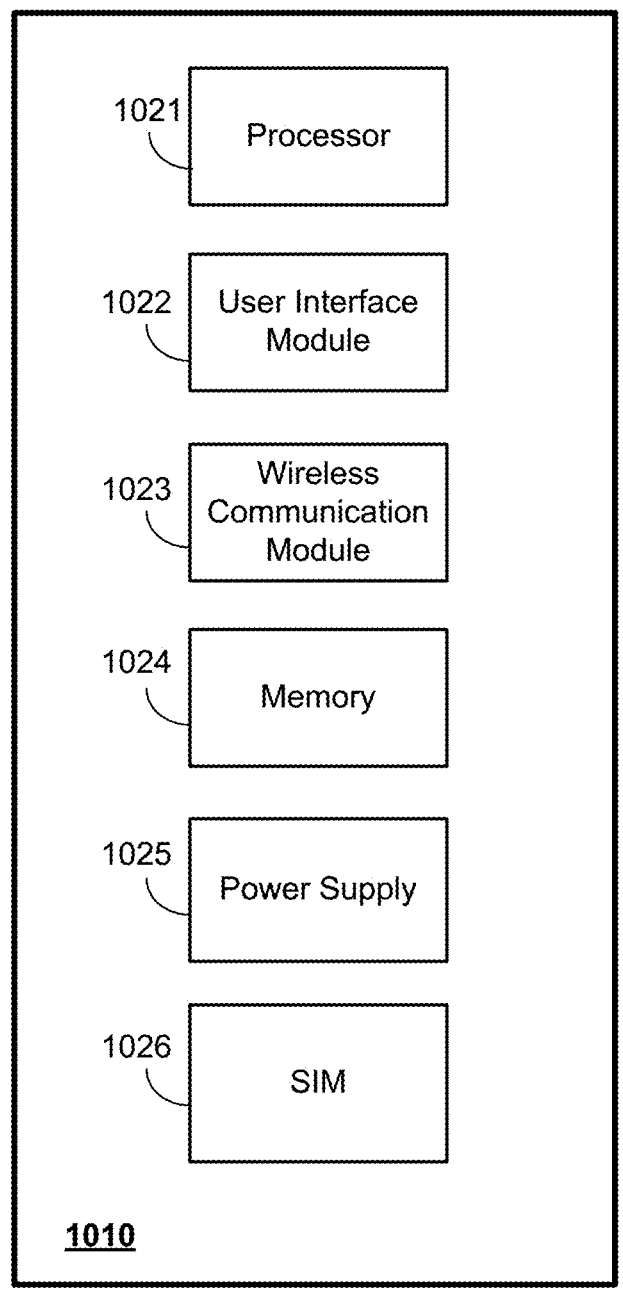
FIG. 5 illustrates a block diagram of a non-limiting exemplary mobile device in which one or more disclosed embodiments may be implemented of individually unique key performance indicator management.

FIG. 5 illustrates an example wireless device 1010 (i.e., WTRU) that may be used in connection with an embodiment of individually unique key performance indicator management. References will also be made to other figures of the present disclosure as appropriate. For example, mobile devices 216 and 217 may be wireless devices of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 4 may be performed by any number or types of hardware or hardware and software.

Processor 1021 may comprise any appropriate circuitry that performs operations on behalf of wireless device 1010. Such circuitry may include hardware and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 1021 and such other devices and/or components to perform any of the disclosed functions and methods. In one embodiment, processor 1021 executes software (i.e., computer readable instructions stored in a computer readable medium) that may include functionality related to individual unique KPI management, for example. User interface module 1022 may be any type or combination of hardware and software that enables a user to operate and interact with wireless device 1010, and, in one embodiment, to interact with a system enabling the user to place, request, and/or receive calls, text communications of any type, voicemail, voicemail notifications, voicemail content and/or data, and/or a system. For example, user interface module 1022 may include a display, physical and/or "soft" keys, voice recognition software, a microphone, a speaker and the like. Wireless communication module 1023 may be any type of transceiver including any combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
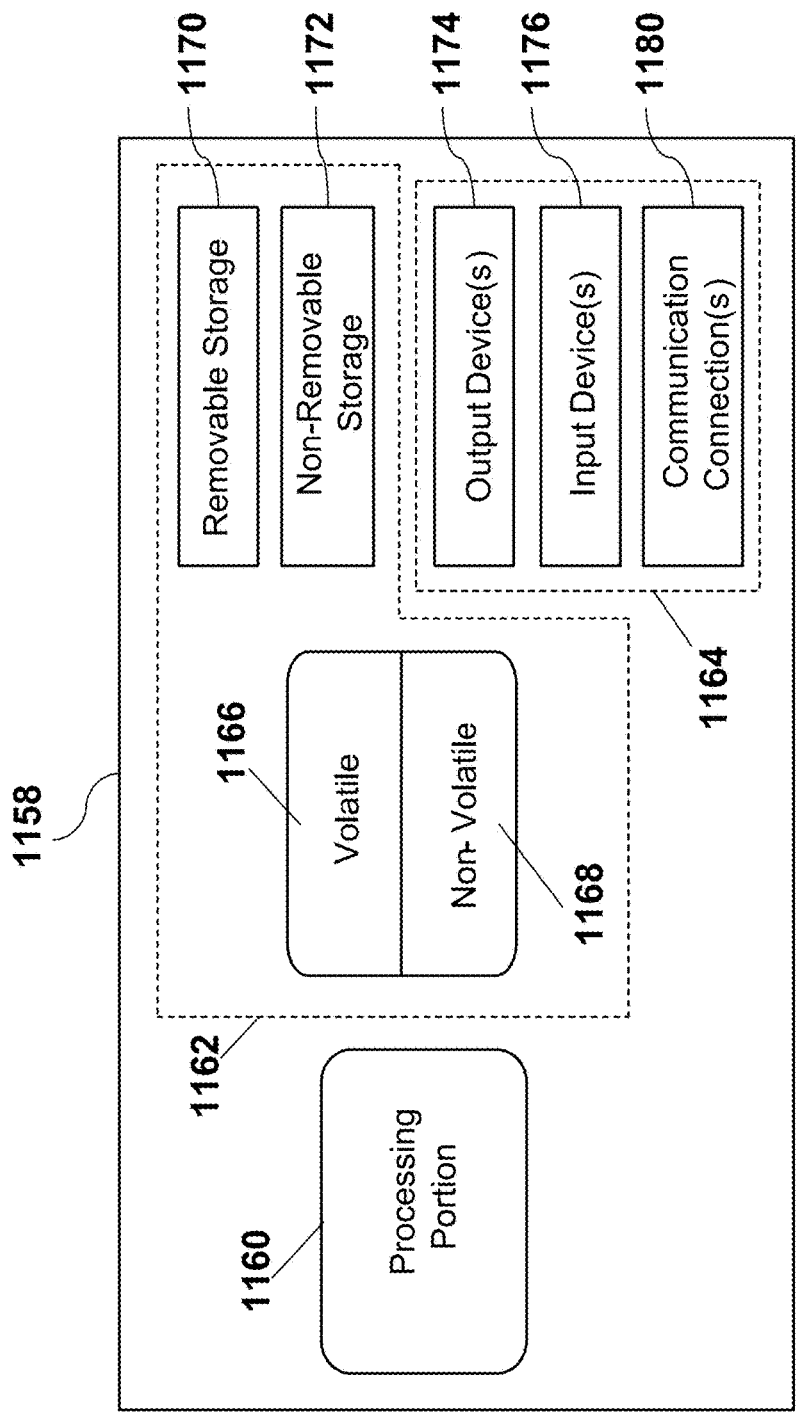
FIG. 6 illustrates a block diagram of a non-limiting exemplary processor in which one or more disclosed embodiments may be implemented of individually unique key performance indicator management.

FIG. 6 is a block diagram of an example apparatus 1158 which may be employed in any of the embodiments described herein, including as one or more components of mobile devices 216, as one or more components of network equipment such as S-GW 215, PDN Gateway 242 any other component of network 200, and/or any related equipment, and/or as one or more components of any third party system or subsystem that may implement any portion of the subject matter described herein. Apparatus 1158 may be a processor. It is emphasized that the block diagram depicted in FIG. 6 is exemplary and not intended to imply a specific implementation. Thus, the apparatus 1158 may be implemented in a single processor or multiple processors. Multiple processors can be distributed or centrally located. Multiple processors may communicate wirelessly, via hard wire, or a combination thereof. Apparatus 1158 may include circuitry and other components that enable apparatus 1158 to perform any of the functions and methods described herein. Such circuitry and other components may also enable apparatus 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 6, the apparatus 1158 may comprise a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 1158 may be implemented as a client processor and/or a server processor. In a basic configuration, the apparatus 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for individual unique KPI management, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The apparatus 1158 can have additional features/functionality. For example, the apparatus 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 1158. Any such computer storage media may be part of the apparatus 1158.

The apparatus 1158 may also contain the communications connection(s) 1180 that allow the apparatus 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how individual unique KPI management may be implemented with stationary and non-stationary network structures and architectures in order to do individual unique KPI management. It can be appreciated, however, that individual unique KPI management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, individual unique KPI management may be applied independently of the method of data transport and does not depend on any particular network architecture or underlying protocols.

Figure 7:
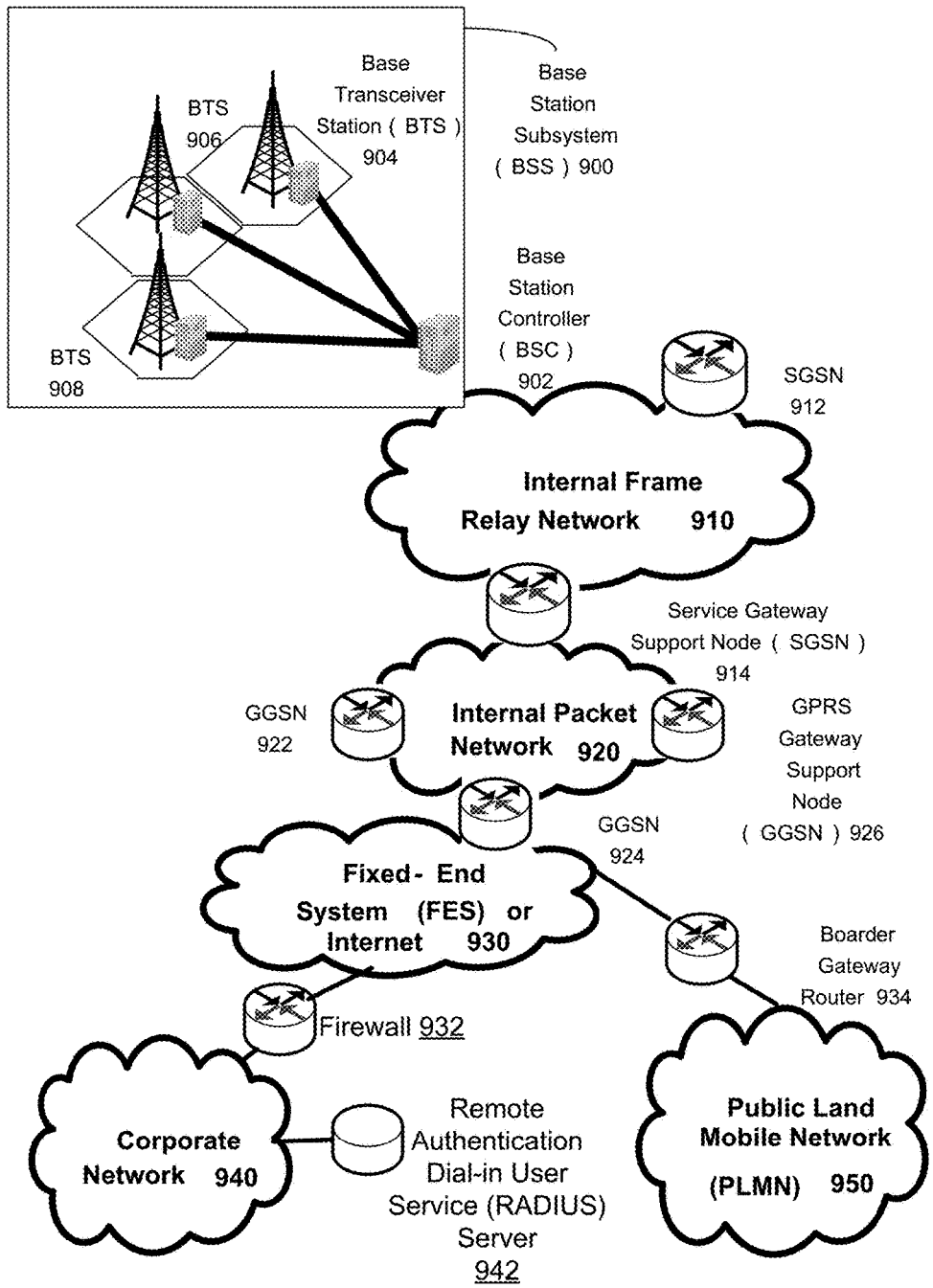
FIG. 7 illustrates a block diagram of a non-limiting exemplary packet-based mobile cellular network environment, such as a GPRS network, in which one or more disclosed embodiments may be implemented of individually unique key performance indicator management.

FIG. 7 depicts an overall block diagram of an exemplary packet-based mobile cellular network environment, such as a GPRS network, in which individual unique KPI management systems and methods such as those described herein may be practiced. In an example configuration, any RAN as described herein may be encompassed by or interact with the network environment depicted in FIG. 7. Similarly, mobile devices 216 and 217 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 216 and 217) become connected to the wireless network. In exemplary fashion, the packet traffic originating from user devices (e.g., mobile devices 216 and 217) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
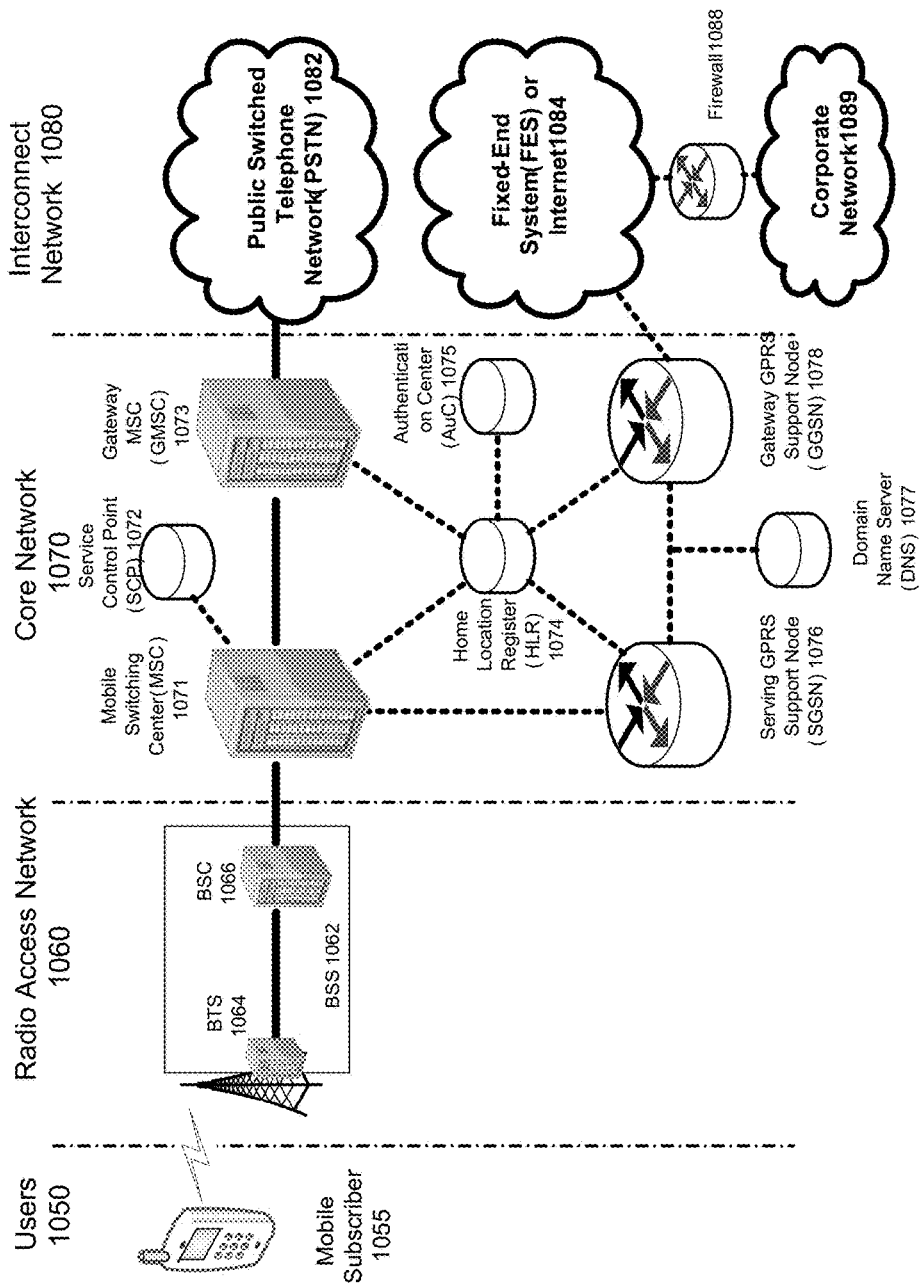
FIG. 8 illustrates a non-limiting exemplary architecture of a typical GPRS network, segmented into four groups, in which one or more disclosed embodiments may be implemented of individually unique key performance indicator management.

FIG. 8 illustrates architecture of a typical GPRS network segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise any of mobile devices 216 and 217. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 216 and 217, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of individual unique KPI management systems and methods such as those described herein may include, but are not limited to, Gateway GPRS Support Node tables, Fixed End System router tables, firewall systems, VPN tunnels, and any number of other network elements as required by the particular digital network.

Figure 9:
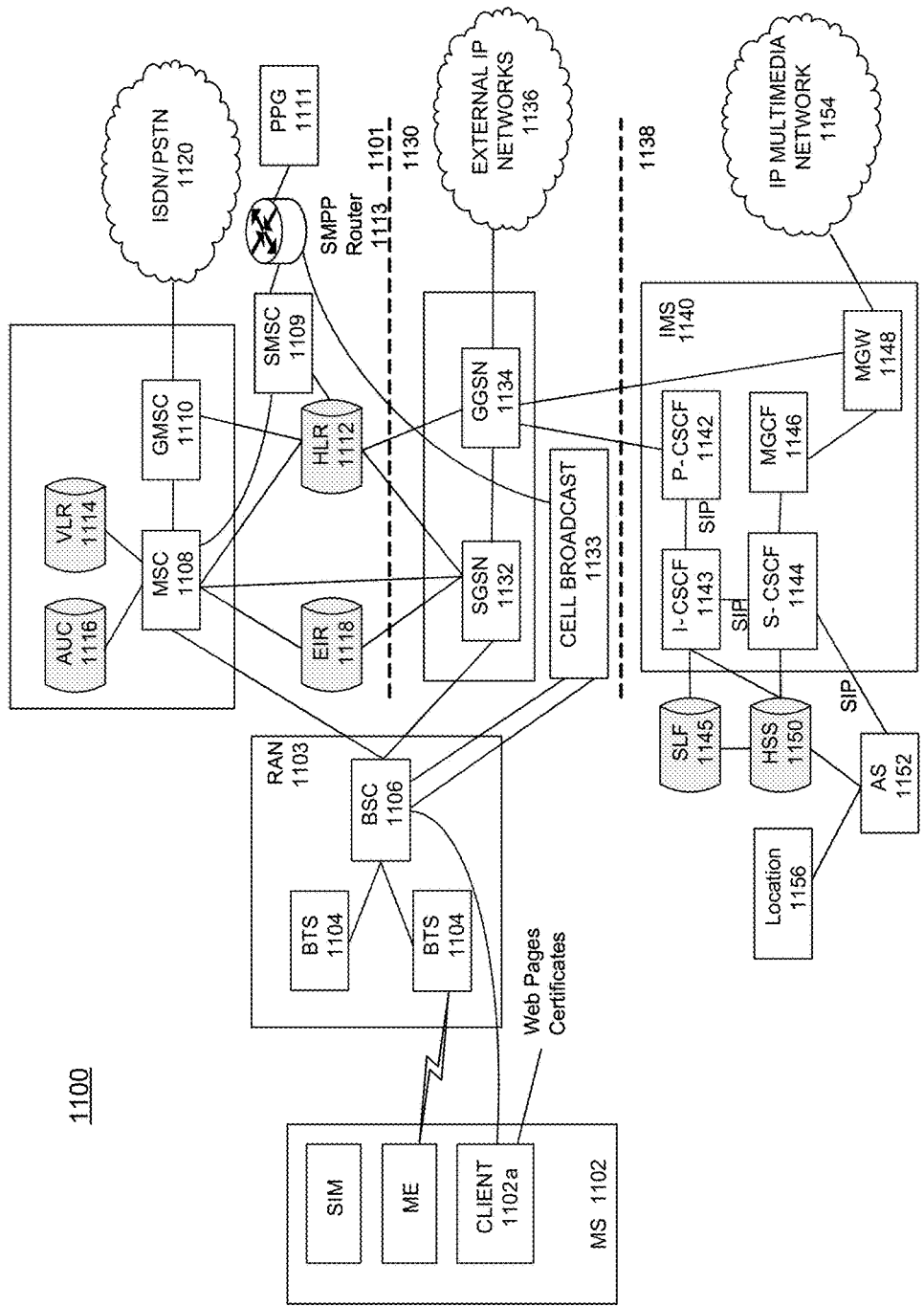
FIG. 9 illustrates a non-limiting alternate block diagram of an exemplary GSM/GPRS/IP multimedia network architecture in which one or more disclosed embodiments may be implemented of individually unique key performance indicator management.

FIG. 9 illustrates another exemplary block diagram view of a GSM/GPRS/IP multimedia network architecture 1100 in which the systems and methods for individual unique KPI management such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 216 and 217) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 10:
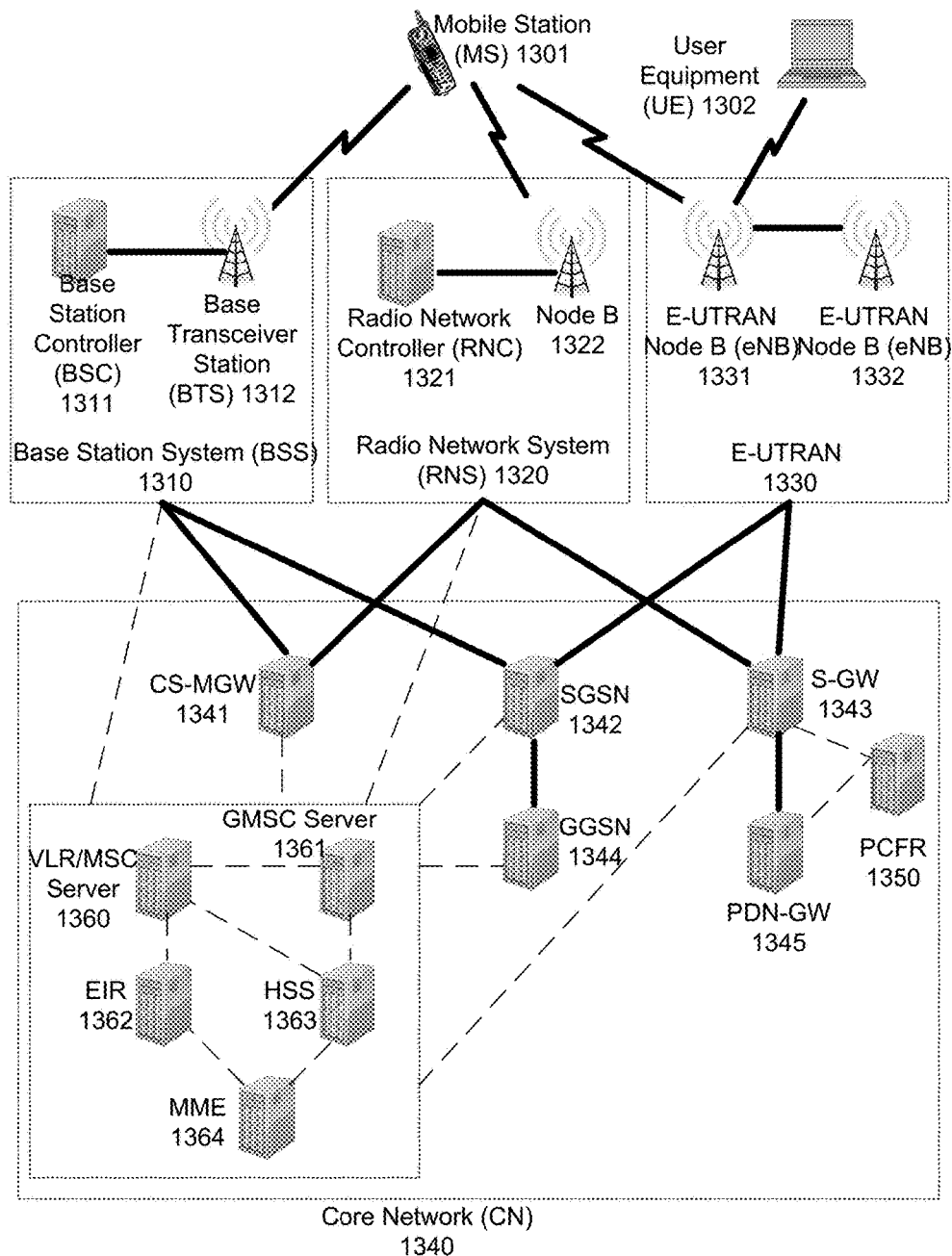
FIG. 10 illustrates a Public Land Mobile Network (PLMN) block diagram view of an exemplary architecture in which one or more disclosed embodiments may be implemented of individually unique key performance indicator management.

FIG. 10 illustrates a PLMN block diagram view of an exemplary architecture in which individual unique KPI management may be incorporated. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 10 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of individual unique KPI management have been described in connection with various communications devices and computing devices/processors, the underlying concepts can be applied to any communications or computing device, processor, or system capable of implementing the individual unique KPI management systems and methods described. The various techniques described herein may be implemented in connection with hardware, or a combination of hardware and software. Thus, individual unique KPI management, or certain aspects or portions thereof, may take the form of program code (i.e., instructions) embodied in tangible and/or media for persistent storage (i.e., non-transitory media), such as floppy diskettes, CD-ROMs, hard drives, or any other machine-readable storage medium, wherein, when the program code is loaded into and executed by a machine, such as a computer, the machine becomes an apparatus for individual unique KPI management. A computer-readable storage medium, as described herein is an article of manufacture, and thus, not to be construed as a propagating signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations. The components described herein are not software per se. A device may comprise a processor and memory, and the memory may include executable instructions that when executed by the processor cause the device to effectuate operations, as described herein, to implement individually unique key performance indicator management.

Individual unique KPI management also may be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for individual unique KPI management. When implemented on a general-purpose processor, the program code combines with the processor to provide a unique apparatus that operates to invoke the functionality of individual unique KPI management as described herein. Additionally, any storage techniques used in connection with an individual unique KPI management may invariably be a combination of hardware and software.

While individual unique KPI management-have been described in connection with the various embodiments of the various figures, it is to be understood that other similar embodiments may be used or modifications and additions may be made to the described embodiments for performing the same function of individual unique KPI management without deviating therefrom. For example, one skilled in the art will recognize individual unique KPI management as described in the present application may apply to any environment, whether wired or wireless, and may be applied to any number of such devices connected via a communications network and interacting across the network. Therefore, individual unique KPI management should not be limited to any single embodiment, but rather should be construed in breadth and scope in accordance with the appended claims.

What is claimed:

1. A method comprising:
    based on a user profile associated with a first mobile device connected to a network, determining, by a processor, a warning alarm threshold for a key performance indicator of an operation of the first mobile device;
    receiving, by the processor, an alert message indicative of reaching the warning alarm threshold; and
    modifying a network device connected to the network based on the alert message,
    wherein the user profile located in a home subscriber server,
    wherein the key performance indicator is associated with the first mobile device based on a subscriber identification or a device identification of the first mobile device.

2. The method of claim 1, wherein the network device is a router.

3. The method of claim 1, wherein the modifying of the network device comprises:
    causing a base station to disconnect from the first mobile device;
    dropping a call of a second mobile device;
    lowering a data rate of a second mobile device;
    activating a dormant base station for use by the first mobile device;
    causing the base station to allocate additional wireless channels for the first mobile device, or
    redirecting a second mobile device to a different base station to accommodate the first mobile device.

4. The method of claim 1, wherein the modifying of the network device comprises:
    modifying a power output of the network device; or
    modifying a number of wireless antennas used by the network device.

5. The method of claim 1, wherein the modifying of the network device comprises:
    modifying a type of wireless antennas used by the network device; or
    closing applications on the network device that negatively influence the key performance indicator.

6. A device comprising:
    a processor; and
    a memory coupled with the processor, the memory comprising executable instructions that, when executed by the processor, cause the processor to effectuate operations comprising:
        based on a user profile associated with a first mobile device connected to a network, determining a key performance indicator of an operation of the first mobile device;
        receiving an alert message based on the key performance indicator reaching a warning alarm threshold; and
        responsive to receiving the alert message, modifying a network device connected to the network,
    wherein the user profile located in a home subscriber server,
    wherein the key performance indicator is associated with the first mobile device based on a subscriber identification or a device identification of the first mobile device.

7. The device of claim 6, wherein the network device is a router.

8. The device of claim 6, wherein the modification of the network device comprises:
    causing a base station to disconnect from the first mobile device; or
    dropping a call of a second mobile device.

9. The device of claim 6, wherein the modification of the network device comprises:
    lowering a data rate of a second mobile device; or
    activating a dormant base station for use by the first mobile device.

10. The device of claim 6, wherein the modification of the network device comprises:
    causing a base station to allocate additional wireless channels for the first mobile device, or
    redirecting a second mobile device to a different base station to accommodate the first mobile device.

11. A system comprising:
    a first mobile device connected to a network; and
    a home subscriber server comprising:
        a processor; and
        a memory coupled with the processor, the memory comprising executable instructions that, when executed by the processor, cause the processor to effectuate operations comprising:

storing a key performance indicator of an operation of the first mobile device connected to the network;

receiving an alert message based on reaching a warning alarm threshold for the key performance indicator; and modifying a network device based on the alert message, wherein the key performance indicator is associated with the first mobile device based on a subscriber identification or a device identification of the first mobile device.

12. The system of claim 11, wherein the network device is a router.

13. The system of claim 11, wherein the modification of the network device comprises dropping a call of a second mobile device.

14. The system of claim 11, wherein the modification of the network device comprises activating a dormant base station for use by the first mobile device.

15. The system of claim 11, wherein the modification of the network device comprises redirecting a second mobile device to a different base station to accommodate the first mobile device.

* * * * *